(12) United States Patent
Narduzzi

(10) Patent No.: US 12,548,068 B2
(45) Date of Patent: Feb. 10, 2026

(54) SYSTEM AND METHODS FOR MANAGING TRANSFERS OF DIGITAL ASSETS

(71) Applicant: The Toronto-Dominion Bank, Toronto (CA)

(72) Inventor: Kerry Narduzzi, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 229 days.

(21) Appl. No.: 18/365,574

(22) Filed: Aug. 4, 2023

(65) Prior Publication Data

US 2025/0045719 A1     Feb. 6, 2025

(51) Int. Cl.
*G06Q 30/00*      (2023.01)
*G06Q 30/0601*   (2023.01)

(52) U.S. Cl.
CPC ..... *G06Q 30/0641* (2013.01); *G06Q 30/0625* (2013.01); *G06Q 30/0633* (2013.01)

(58) Field of Classification Search
CPC .... G06Q 30/00; G06Q 30/06; G06Q 30/0601; G06Q 30/0623; G06Q 30/0625; G06Q 30/0633; G06Q 30/0641
See application file for complete search history.

(56) References Cited

U.S. PATENT DOCUMENTS

| | | | | |
|---|---|---|---|---|
| 6,731,788 B1* | 5/2004 | Agnihotri | ............. | G11B 27/28 |
| | | | | 382/165 |
| 8,458,053 B1* | 6/2013 | Buron | ................ | H04N 21/4316 |
| | | | | 705/26.1 |
| 8,660,912 B1* | 2/2014 | Dandekar | .............. | G06Q 30/02 |
| | | | | 705/26.1 |
| 11,200,569 B1 | 12/2021 | James et al. | | |
| 11,276,059 B2 | 3/2022 | Mendhi et al. | | |
| 11,501,297 B1 | 11/2022 | Tai et al. | | |
| 2007/0050406 A1* | 3/2007 | Byers | ...................... | G06F 16/48 |

(Continued)

OTHER PUBLICATIONS

Torres, Christof Ferreira, Fiona Willi, and Shweta Shinde. "Is your wallet snitching on you? an analysis on the privacy implications of web3." 32nd USENIX Security Symposium (USENIX Security 23). 2023. (Year: 2023).*

(Continued)

*Primary Examiner* — Christopher B Seibert
(74) *Attorney, Agent, or Firm* — Rowand LLP

(57) ABSTRACT

A computer-implemented method is disclosed. The method includes: receiving, via a client device, a request to access a catalogue of digital assets, the request indicating one or more asset parameters; determining a first set of digital assets to present via the client device based on filtering a plurality of digital assets using the one or more asset parameters; providing, via a user interface on the client device, one or more user interface elements corresponding to the first set of digital assets; receiving, via the client device, a selection of one of the user interface elements corresponding to a first digital asset and a request to purchase the first digital asset; determining that the client device is associated with a first resource account at a protected data resource; and processing a payment in connection with purchase of the first digital asset, wherein the processing includes determining that a data transfer is received via a digital wallet associated with the first resource account.

18 Claims, 7 Drawing Sheets

(56) References Cited

U.S. PATENT DOCUMENTS

| | | | | |
|---|---|---|---|---|
| 2007/0106570 | A1* | 5/2007 | Hartman | G06Q 30/0605 705/26.8 |
| 2007/0294240 | A1* | 12/2007 | Steele | G06F 16/338 707/999.005 |
| 2008/0080392 | A1* | 4/2008 | Walsh | H04L 67/1053 370/254 |
| 2008/0167946 | A1* | 7/2008 | Bezos | G06Q 30/0613 705/26.1 |
| 2009/0037291 | A1* | 2/2009 | Dawson | G06Q 30/0603 705/27.2 |
| 2010/0114654 | A1* | 5/2010 | Lukose | G06Q 30/00 705/14.54 |
| 2012/0136756 | A1* | 5/2012 | Jitkoff | G06F 16/9577 715/224 |
| 2012/0233020 | A1* | 9/2012 | Eberstadt | G06Q 30/06 705/26.1 |
| 2013/0013427 | A1* | 1/2013 | Gonsalves | G06Q 30/02 705/27.1 |
| 2014/0025521 | A1* | 1/2014 | Alsina | G06Q 30/0601 705/26.1 |
| 2014/0136990 | A1* | 5/2014 | Gonnen | H04L 51/18 715/752 |
| 2014/0297537 | A1* | 10/2014 | Kassemi | G06Q 20/401 705/67 |
| 2015/0052061 | A1* | 2/2015 | Anderson | G06Q 20/409 705/44 |
| 2015/0088686 | A1* | 3/2015 | Glassberg | G06Q 50/01 705/26.8 |
| 2015/0095238 | A1* | 4/2015 | Khan | G06Q 20/12 705/71 |
| 2015/0317698 | A1* | 11/2015 | Kalyvas | G06Q 30/0214 705/14.66 |
| 2015/0324789 | A1* | 11/2015 | Dvorak | H04L 9/3297 705/67 |
| 2019/0378166 | A1* | 12/2019 | Eich | G06Q 30/0246 |
| 2020/0042989 | A1 | 2/2020 | Ramadoss et al. | |
| 2020/0193541 | A1* | 6/2020 | Barry | H04L 9/50 |
| 2021/0082044 | A1 | 3/2021 | Sliwka et al. | |
| 2022/0351195 | A1 | 11/2022 | Quigley et al. | |
| 2022/0383299 | A1 | 12/2022 | Apollo et al. | |
| 2022/0398538 | A1 | 12/2022 | Jakobsson et al. | |
| 2022/0398666 | A1 | 12/2022 | Apollo et al. | |
| 2022/0414649 | A1 | 12/2022 | Shannon, III et al. | |
| 2023/0055618 | A1 | 2/2023 | Jakobsson et al. | |
| 2023/0071093 | A1* | 3/2023 | Madhusudhan | G06Q 30/0601 |
| 2024/0265124 | A1* | 8/2024 | Frattura | G06F 21/6218 |

OTHER PUBLICATIONS

Khan, Abdul Ghaffar, et al. "Security of cryptocurrency using hardware wallet and qr code." 2019 International Conference on Innovative Computing (ICIC). IEEE, 2019. (Year: 2019).*

Dragos et al.: "NFT. finance leveraging non-fungible tokens", published in Imperial College London, Department of Computing, on Jun. 15, 2020.

Telamon: "Membership NFTs: blockchain technology, opportunities, and implementation of utility based Non-Fungible-Tokens", published in Thesis, LAB University of Applied Sciences, 2022.

* cited by examiner

SYSTEM AND METHODS FOR MANAGING TRANSFERS OF DIGITAL ASSETS

TECHNICAL FIELD

The present disclosure relates to digital assets and, in particular, to a system and methods for managing transfers of digital assets.

BACKGROUND

A distributed computing network may facilitate exchange of digital assets. In particular, a blockchain-based platform may be used for handling transfers of digital assets. Non-fungible tokens ("NFTs") are unique digital assets having blockchain-based authenticity, ownership and transferability features. The unique identity and ownership of an NFT can be verified via a blockchain ledger. An NFT can be used to cause artificial scarcity of a digital asset by making only a limited number (e.g., one) of NFTs of that asset. NFTs can be purchased and sold peer-to-peer or on dedicated secondary marketplaces. Utility NFTs provide holders with real-world rewards and other privileges linked to ownership.

BRIEF DESCRIPTION OF THE DRAWINGS

Embodiments will be described, by way of example only, with reference to the accompanying figures wherein.

DETAILED DESCRIPTION OF EMBODIMENTS

Figure 1:
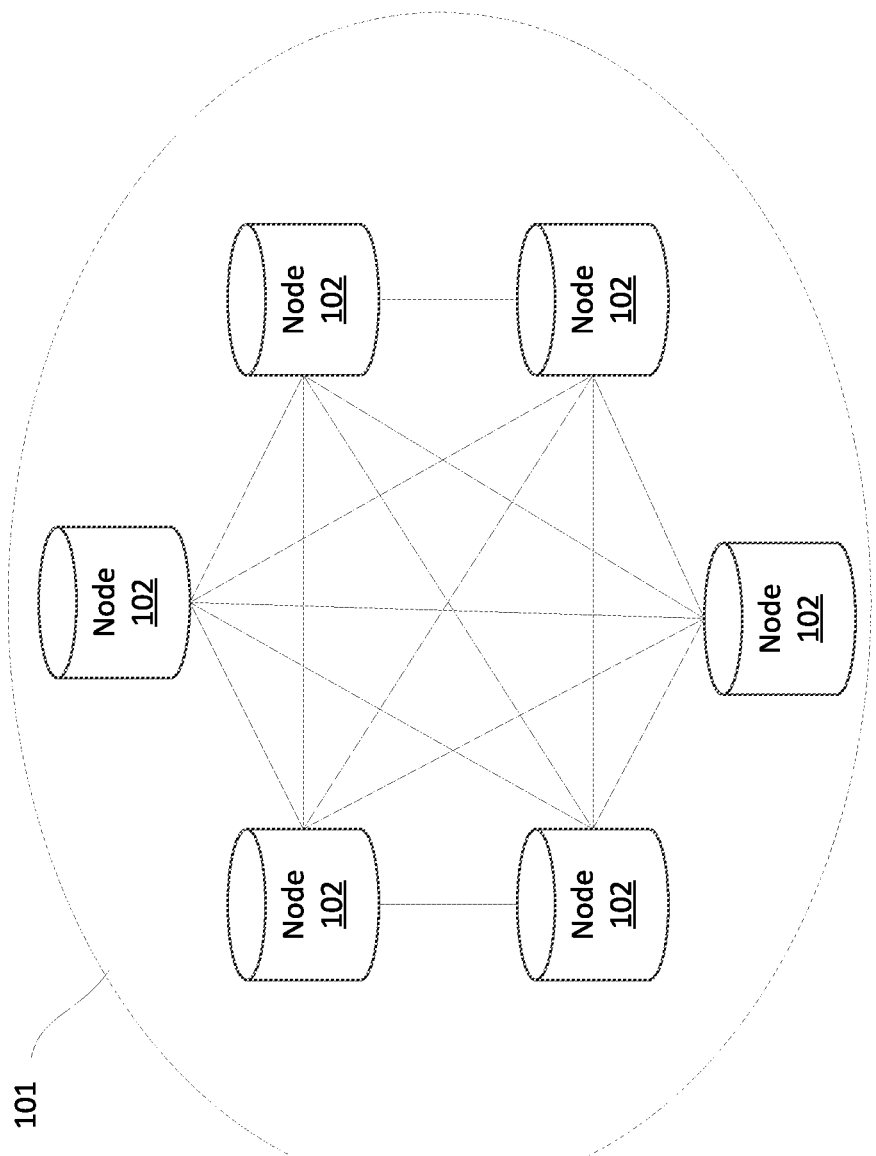
FIG. 1 illustrates an example network associated with a blockchain.

In an aspect, the present application discloses a computing system. The computing system includes a processor and a memory coupled to the processor. The memory stores processor-executable instructions that, when executed by the processor, are to cause the processor to: receive, via a client device, a request to access a catalogue of digital assets, the request indicating one or more asset parameters; determine a first set of digital assets to present via the client device based on filtering a plurality of digital assets using the one or more asset parameters; provide, via a user interface on the client device, one or more user interface elements corresponding to the first set of digital assets; receive, via the client device, a selection of one of the user interface elements corresponding to a first digital asset and a request to purchase the first digital asset; determine that the client device is associated with a first resource account at a protected data resource; and process a payment in connection with purchase of the first digital asset, wherein the processing includes determining that a data transfer is received via a digital wallet associated with the first resource account.

In some implementations, the digital assets may comprise at least one non-fungible token (NFT).

In some implementations, each of the digital assets of the first set may comprise a token associated with a defined project data object and the project data object may be validated by a regulator entity prior to being presented via the client device as part of the first set.

In some implementations, the protected data resource may comprise a computing system associated with a bank server and the first resource account may comprise a bank account of a user of the client device.

In some implementations, the digital wallet may comprise a Web3 wallet.

In some implementations, the instructions, when executed, may further cause the processor to transfer the first digital asset to the digital wallet associated with the first resource account.

In some implementations, the project data object may comprise display data associated with a validated project for presenting via the client device.

In some implementations, the digital asset may comprise a token for accessing access-limited features associated with the project data object.

In some implementations, the first digital asset may comprise one of a limited set of tokens that are available in connection with a defined project data object.

In some implementations, processing the payment in connection with purchase of the first digital asset may include validating a login of a user associated with the client device to the first resource account prior to receiving the payment.

In another aspect, the present application discloses a computer-implemented method. The method includes: receiving, via a client device, a request to access a catalogue of digital assets, the request indicating one or more asset parameters; determining a first set of digital assets to present via the client device based on filtering a plurality of digital assets using the one or more asset parameters; providing, via a user interface on the client device, one or more user interface elements corresponding to the first set of digital assets; receiving, via the client device, a selection of one of the user interface elements corresponding to a first digital asset and a request to purchase the first digital asset; determining that the client device is associated with a first resource account at a protected data resource; and processing a payment in connection with purchase of the first digital asset, wherein the processing includes determining that a data transfer is received via a digital wallet associated with the first resource account.

In yet another aspect, a non-transitory, computer readable storage medium is disclosed. The computer readable storage medium contains instructions thereon which, when executed by a processor, are to cause the processor to: receive, via a client device, a request to access a catalogue of digital assets, the request indicating one or more asset parameters; determine a first set of digital assets to present via the client device based on filtering a plurality of digital assets using the one or more asset parameters; provide, via a user interface on the client device, one or more user interface elements corresponding to the first set of digital assets; receive, via the client device, a selection of one of the user interface elements corresponding to a first digital asset and a request to purchase the first digital asset; determine that the client device is associated with a first resource account at a protected data resource; and process a payment in connection with purchase of the first digital asset, wherein the processing includes determining that a data transfer is received via a digital wallet associated with the first resource account.

In an aspect, the present application discloses a computing system. The computing system includes a processor and a memory coupled to the processor. The memory stores processor-executable instructions that, when executed by the processor, are to cause the processor to: obtain asset data associated with one or more digital assets from a plurality of public blockchain networks and digital asset marketplaces; receive, via a client device, a request to access asset data of first digital assets; and cause to be selectively displayed, via a user interface on the client device, a subset of the obtained asset data that is associated with the first digital assets.

In some implementations, the digital assets comprise at least one non-fungible token (NFT).

In some implementations, obtaining the asset data associated with the one or more digital assets may include transmitting, to multiple public blockchain networks and digital asset marketplaces via a batch process, data retrieval requests to obtain the asset data.

In some implementations, the data retrieval requests may be transmitted in response to receiving the request to access asset data of the first digital assets.

In some implementations, the asset data may be obtained via WebSocket interfaces associated with one or more of the public blockchain networks or digital asset marketplaces.

In some implementations, the instructions, when executed, may further cause the processor to: receive, via a client device, a request to connect a digital wallet to the digital asset platform; and store, in a memory, authentication credentials associated with the digital wallet.

In some implementations, the digital wallet may comprise a Web3 wallet.

In some implementations, the instructions, when executed, may further cause the processor to: receive a login request for logging in to a user account on the digital asset platform, the login request including a digital signature generated using a private key associated with a user's digital wallet; and validate a login based on verifying the digital signature using a public key associated with the user.

In some implementations, the request to access asset data of first digital assets may comprise input of a search query to initiate search of digital assets associated with the public blockchain networks and digital asset marketplaces.

In another aspect, the present application discloses a computer-implemented method. The method includes: obtaining asset data associated with one or more digital assets from a plurality of public blockchain networks and digital asset marketplaces; receiving, via a client device, a request to access asset data of first digital assets; and causing to be selectively displayed, via a user interface on the client device, a subset of the obtained asset data that is associated with the first digital assets.

In yet another aspect, a non-transitory, computer readable storage medium is disclosed. The computer readable storage medium contains instructions thereon which, when executed by a processor, are to cause the processor to: obtain asset data associated with one or more digital assets from a plurality of public blockchain networks and digital asset marketplaces; receive, via a client device, a request to access asset data of first digital assets; and cause to be selectively displayed, via a user interface on the client device, a subset of the obtained asset data that is associated with the first digital assets.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "blockchain" is used to include all forms of electronic, computer-based, distributed ledgers. These include, but are not limited to, blockchain and transaction-chain technologies, permissioned and un-permissioned ledgers, shared ledgers, and variations thereof.

A blockchain is a consensus-based, electronic ledger which is implemented as a computer-based, decentralised distributed system made up of blocks which, in turn, are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed.

Network nodes that receive a new transaction will try to push that transaction out to other nodes in the network. Before transmitting a new transaction to other nodes, it is "validated"; that is, the transaction is checked against a set of criteria to ensure that it meets the basic requirements for a proper transaction, in accordance with the applicable blockchain protocol.

In order for a transaction to be written to the blockchain, it is incorporated into a block by a node (a "miner" or "mining node") that is designed to collect transactions and form them into blocks. The miner then attempts to complete a "proof of work" with respect to the node. Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

Managing Transfers of Digital Assets

"Digital assets" refer to assets that are in digital format and that come with the right to use. In particular, a digital asset is self-contained, uniquely identifiable, and is associated with a defined value or ability to use. Examples of digital assets include, among others, digital documents, multimedia files (e.g., photos, audiovisual media, animations, etc.), electronic mails, websites, cryptocurrencies, digital wallets, and asset-backed tokens.

Blockchain technology has created new efficiencies in the markets and is often a favored medium in which to exchange digital assets. Blockchains allow parties to unequivocally prove certain aspects of a digital asset, such as ownership, authenticity, and transactions history, without the need to involve a centralized or intermediary entity. Blockchains produce a structure of data with inherent security qualities-combining cryptography, decentralization and consensus, blockchain technology can ensure trust in the transactions that are conducted on blockchain-run platforms.

The rapid growth of software applications and the blockchain-based asset space has given rise to various different types of digital assets. An example of a digital asset class that has been garnering a great deal of interest is non-fungible tokens, or NFTs. NFTs are unique digital assets having blockchain-based authenticity, ownership, and transferability features. More specifically, an NFT is a unit of data stored on a blockchain that certifies a digital asset to be unique. NFTs can represent a wide range of assets, physical or digital, including but not limited to: digital art, collectible items, music, digital movies, games, and the like. An NFT functions as a digital certificate of ownership for any assigned digital asset. A key feature of NFTs is that they are not mutually interchangeable—each NFT has a unique identification code and metadata such that it is distinguishable from any other NFT. The unique identity and ownership of an NFT is verifiable using the blockchain ledger.

Blockchain networks, like Ethereum, have token standards that enable developers to deploy NFTs and ensure that they are compatible with the broader ecosystem, including exchanges and wallet services. NFTs can be sold and bought by means of off-chain transactions. In particular, a buyer may conduct an off-chain payment to acquire an NFT and upon successful completion of the payment transaction, the NFT can be transferred from the owner/seller to the buyer. For example, the NFT may be transferred from a seller's digital wallet to the buyer's digital wallet on completion of an off-chain payment. It is desired to maintain the high level of security of a blockchain-based solution for transferring digital assets while maintaining the flexibility to handle off-chain transactions in connection with the transfers.

The current NFT eco-system is rife with pain points for investors. Average investors have a difficult time accessing NFTs as investment due to lack of information and support, technical complexities associated with purchasing NFTs, and low level of investor trust. The NFT market lacks simplicity, trust, and ability to provide investment opportunities that connect to core values and interests of prospective investors.

In an aspect, a funding platform is disclosed. The proposed platform is supported by utility NFTs, and enables prospective investors to find projects to invest in. Buyers can browse and sort through vetted projects across various types and interest areas, and can build direct connections with creators and communities and reap financial rewards from their success. The projects may be vetted by a bank institution that facilitates integration of the funding platform with bank accounts of prospective investors.

The funding platform enables filtering projects based on suitability, sorting based on risk, and integration of community activity and feedback. Furthermore, the platform includes support for multiple wallets and payment methods. Specifically, buyers can leverage Web3 (i.e., digital) wallets that integrate with bank accounts, which allows purchase of NFTs using fiat money from existing accounts and thereby simplifying the purchase experience.

The platform may also serve as a marketplace for NFTs. Creators (e.g., artists) can list their offerings on the marketplace to avail the offerings, such as projects, to buyers. For example, an NFT may comprise a "share" in a project (e.g., a musical album) that can be purchased, where the share represents a share in royalties (and more generally, revenue) associated with the project. An investor can log in to their bank account which integrates with a Web3 wallet, and purchase an NFT with fiat money from their bank account.

In another aspect, an aggregator application for use in searching for and retrieving NFT data is disclosed. The application may employ a three-tier architecture along with a batch process. The batch may include an ETL pipeline which gathers data from multiple sources and loads it into a database that supports the application. The data sources may include, among others: services (e.g., Alchemy API) providing interfaces that expose various blockchains' data; APIs providing data related to NFT collections (e.g., Rarible API); APIs (e.g., Coinbase API) providing exchange rate information between currencies, including cryptocurrencies; and source location for media content displayed via a user interface of the application. Certain ones of the data sources may provide Websocket interfaces, which may allow data to be captured in real-time (or near real-time) as blockchain events occurs.

The aggregator application enables search of NFTs from one or more blockchains and marketplaces. Users can browse and sort through NFT collections, trending NFTs, etc., across various types and interest areas. The aggregator application may include support for multiple wallets and payment methods. Specifically, users can leverage Web3 (i.e., digital) wallets that integrate with bank accounts, which allows purchase of NFTs using fiat money from existing accounts. A user can connect their Web3 wallet to the aggregator application. If a wallet is connected, it can be used as the user's future login for authentication purposes. A user's digital signature may be required in order to log in and/or create a profile. The digital signature may be generated through a private key associated with the user that is stored in their Web3 wallet. The signature can be verified using the user's public key by the aggregator application.

After a user's Web3 wallet is connected to the aggregator application, the frontend receives a nonce that is generated via the application's API. The nonce is signed using a digital signature generated through the user's private key stored in the Web3 wallet. The signature is then verified by the application's API, and a JWT token may be generated. The JWT token may then be issued to the frontend of the application.

A graphical user interface of the aggregator application provides access to user account information, such as favorited NFTs, created or collected NFTs, and the like. An NFT details page may include detailed information about a selected NFT, such as an image (or other graphical representation), description, network identity, link to listing marketplace, address of smart contract, unique token ID, NFT name, price, and transfer/sales/minting history.

Reference is first made to FIG. 1, which illustrates, in block diagram form, an example network associated with a blockchain, which may be referred to herein as a blockchain network 101. The blockchain network 101 is a peer-to-peer open membership network which may be joined by anyone, without invitation or without consent from other members. Distributed computing devices running an instance of the blockchain protocol under which the blockchain network 101 operates may participate in the blockchain network 101. Such distributed computing devices may be referred to as nodes 102. The blockchain protocol may be an Ethereum protocol, or another cryptocurrency, for example.

The computing devices that run the blockchain protocol and that form the nodes 102 of the blockchain network 101 may be of various types including, for example, computers such as desktop computers, laptop computers, tablet computers, servers, mobile devices such as smartphones, wearable computers such as smart watches or other computing devices.

Nodes 102 of the blockchain network 101 are coupled to one another using suitable communication technologies which may include wired and wireless communication technologies. The blockchain network 101 may be implemented at least partly over the Internet, and some of the nodes 102 may be located in geographically disparate locations.

Nodes 102 maintain a global ledger of all transactions on the blockchain, grouped into blocks, each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Ethereum protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value, digital asset(s), etc. may be transferred as a result of the transaction. The transferred value (or digital asset(s), etc.) is then associated with that output address as an unspent transaction output (UTXO). A subsequent transaction may then reference that address as an input in order to spend or disperse that value.

Nodes 102 can fulfil numerous different functions, from network routing to wallet services, to maintain a robust and secure decentralized public ledger. "Full nodes" contain a complete and up-to-date copy of the blockchain, and can therefore verify any transaction (spent or unspent) on the public ledger. "Lightweight nodes" (or SPV) maintain a subset of the blockchain and can verify transactions using a "simplified payment verification" technique. Lightweight nodes only download the headers of blocks, and not the transactions within each block. These nodes therefore rely on peers to verify their transactions. "Mining nodes", which can be full or lightweight nodes, are responsible for validating transactions and creating new blocks on the blockchain. "Wallet nodes", which are typically lightweight nodes, handle wallet services of users. Nodes 102 may communicate with each other using a connection-oriented protocol, such as TCP/IP (Transmission Control Protocol).

When a node wishes to send a transaction to a peer, an "INVENTORY" message is sent to the peer, transmitting one or more inventory objects that is known to the transmitting node. If the peer replies with a "GETDATA" message, i.e., a full transaction request, the transaction is sent using a "TRANSACTION" message. The node receiving the transaction may forward it in the same manner-provided that it is a valid transaction—to its peers.

Figure 2:
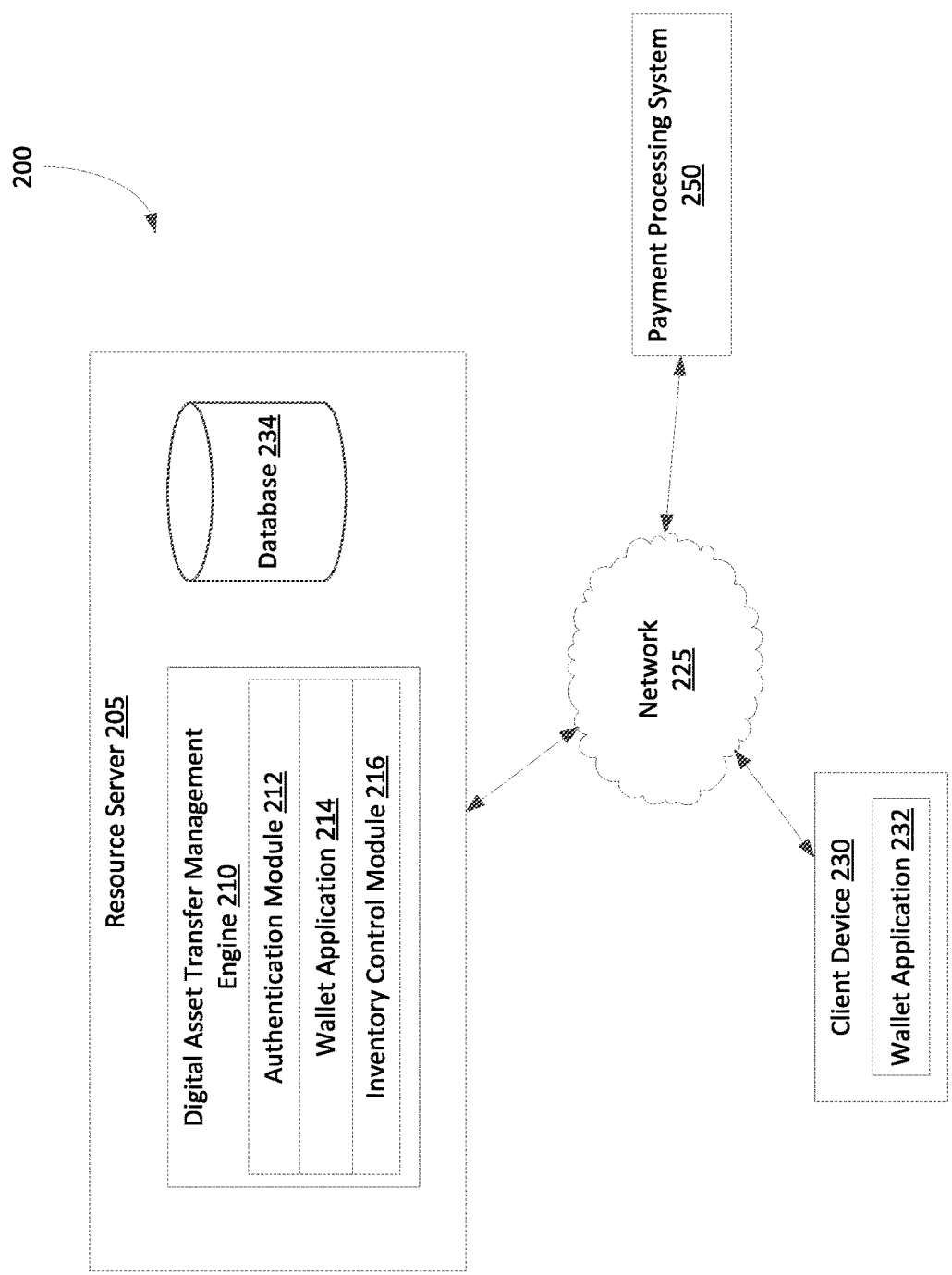
FIG. 2 illustrates an example system for processing transfers of digital assets.

FIG. 2 illustrates an exemplary computing environment 200 consistent with various disclosed embodiments. As shown in FIG. 2, the computing environment 200 may include a resource server 205, client devices 230, a payment processing system 250, and a network 225 connecting one or more of the components of computing environment 200.

The resource server 205 (which may also be referred to as a resource management system) and client devices 230 communicate via the network 225. The client device 230 is a computing device. For example, the client device 230 may be a device of an entity having resources that are associated with the resource server 205. The client device 230 may take a variety of forms including, for example, a mobile communications device such as a smartphone or a tablet computer, a wearable computer such as a head-mounted display or smartwatch, a laptop, a desktop computer, or a computing device of another type.

The client device 230 may be associated with a buyer of digital assets. In particular, the client device 230 may be associated with a customer of a merchant offering digital assets on a marketplace. In at least some embodiments, the client device 230 may have resident thereon a buyer wallet application 232. The buyer wallet application 232 may be a standalone mobile application, a web application accessible via a web browser, or a desktop application. The buyer wallet application 232 may be an application that lets the buyer interact with their blockchain account. For example, the buyer wallet application 232 may allow the buyer to view their balances and transactions history, send transactions, encrypt and/or sign information, and connect to other applications. The buyer wallet application 232 may store various types of data, such as keys (e.g., public and/or private keys) for cryptocurrency transactions and digital assets (e.g., tokens such as NFTs) associated with the buyer.

The resource server 205 may be configured to track, manage, and maintain resources, make lending decisions, and/or lend resources for a plurality of clients. The resources may, for example, include computing resources, such as memory or processor cycles. By way of further example, the resources may include stored value, such as fiat currency, which may be represented in one or more databases. For example, as shown in FIG. 2, the resource server 205 may be coupled to a database 234, which may be provided in secure storage. The secure storage may be provided internally within the resource server 205 or externally. In some embodiments, the secure storage may include one or more data centers. The data centers may, for example, store data with bank-grade security.

The database 234 may include records for a plurality of accounts and at least some of the records may define a quantity of resources associated with an entity. For example, the entity that is associated with the client device 230 may be associated with a resource account having one or more records in the database 234. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated record such as, for example, a bank balance.

The resource server 205 may provide both digital asset transfer management and data holding (e.g., banking) functions. The resource server 205 may, for example, be a financial institution server, and the entity associated with a client device 230 may be a customer of a financial institution operating the resource server 205.

In at least some implementations, the resource server 205 may be a server that implements backend services of a platform for exchanging digital assets. The resource server 205 may perform functions including, among others, authenticating users of the platform, aggregating asset data of digital assets from various blockchain networks, facilitating user purchases of digital assets, and generating and providing a graphical user interface enabling users to access features of the platform.

A digital asset transfer management engine 210 is provided in the resource server 205 of FIG. 2. The digital asset transfer management engine 210 processes requests to transfer digital assets. In particular, the digital asset transfer management engine 210 may enable the resource server 205 to aggregate asset data of digital assets, process customer requests to transfer selected digital assets, and manage the presentation of asset data to customers. The digital asset transfer management engine 210 may be a software-implemented module containing processor-executable instructions that, when executed by one or more processors in the resource server 205, cause the resource server 205 to carry out at least some of the processes and functions described herein.

In some embodiments, the digital asset transfer management engine 210 may be provided as a service that is external to the resource server 205. In particular, the resource server 205 may engage the digital asset transfer management engine 210 as a service that is independent of the resource server 205 and which facilitates processing of digital asset transfers between entities that are associated with the resource server 205. More broadly, in some implementations, the subject matter of the present application may be employed in manners independent of a particular resource server. For example, it may be that the digital asset transfer management engine 210 is implemented and deployed so as to be independent of any resource server.

The digital asset transfer management engine 210 includes a resource server wallet application 214. The resource server wallet application 214 is a wallet application that allows for interacting with an account associated with a blockchain (e.g., an Ethereum account). The account may, for example, be an account of the resource server 205. That is, the resource server wallet application 214 may allow the resource server 205 to send transactions, encrypt and/or sign information, or otherwise interact with a blockchain. In particular, the resource server 205 may interact with smart contracts that are deployed on the blockchain by sending transactions using the resource server wallet application 214. The balances, transactions history, and the like may be stored and/or accessed on the resource server wallet application 214.

The digital asset transfer management engine 210 also includes an inventory control module 216. The inventory control module 216 allows the resource server 205 to track inventory of digital assets that are offered for sale via the platform. In particular, the inventory control module 216 is configured to determine the inventory of digital assets that are available for transferring to customers of the platform. In at least some embodiments, the inventory control module 216 may interface with a blockchain network to access a distributed ledger associated with the blockchain in order to track digital assets and their movements via transactions of the blockchain.

The functionality described herein may be used in commerce to provide improved customer or buyer experiences. The resource server 205 could implement the functionality for any of a variety of different applications, examples of which are described herein. Although the digital asset transfer management engine 210 of FIG. 2 is illustrated as a distinct component of the resource server 205, this is only an example. An engine could also, or instead, be provided by another component residing within or external to the resource server 205. In some implementations, the digital asset transfer management engine 210 may be provided at least in part by a resource server, either as a core function of the resource server or as an application or service supported by or communicating with the resource server. Alternatively, the digital asset transfer management engine 210 may be implemented as a stand-alone service to clients such as a client device. In addition, at least a portion of such an engine could be implemented in the client device. For example, a client device could store and run an engine locally as a software application.

The digital asset transfer management engine 210 is configured to implement at least some of the functionality described herein. Although the embodiments described below may be implemented in association with a resource server, such as (but not limited to) the resource server 205, the embodiments described below are not limited to resource servers.

The payment processing system 250 processes payment requests. The payment processing system 250 may include various payment processing components, including payment servers and payment gateways (not shown). A payment gateway is a third-party operated gateway that receives payment requests from various sources and locations, extracts necessary data from each payment request, and formats it into a prescribed format for transmission to a payment server operated by a payment processor, such as a credit card company, bank, or the like. A payment gateway is typically a first step in payment processing; it may pass along payment information to a specific payment processor to complete the payment processing. The payment gateway receives a success or failure message from the payment processor and prepares and sends a response message to a sender of the payment request.

As described above, the resource server 205, the client device 230, and the payment processing system 250 are computing systems. In particular, each of the resource server 205, the client device 230, and the payment processing system 250 (or components thereof, such as wallet applications, etc.) may be a node, such as node 102, of a blockchain network.

The network 225 is a computer network. In some embodiments, the network 225 may be an internetwork such as may be formed of one or more interconnected computer networks. For example, the network 225 may be or may include an Ethernet network, an asynchronous transfer mode (ATM) network, a wireless network, or the like.

Figure 3A:
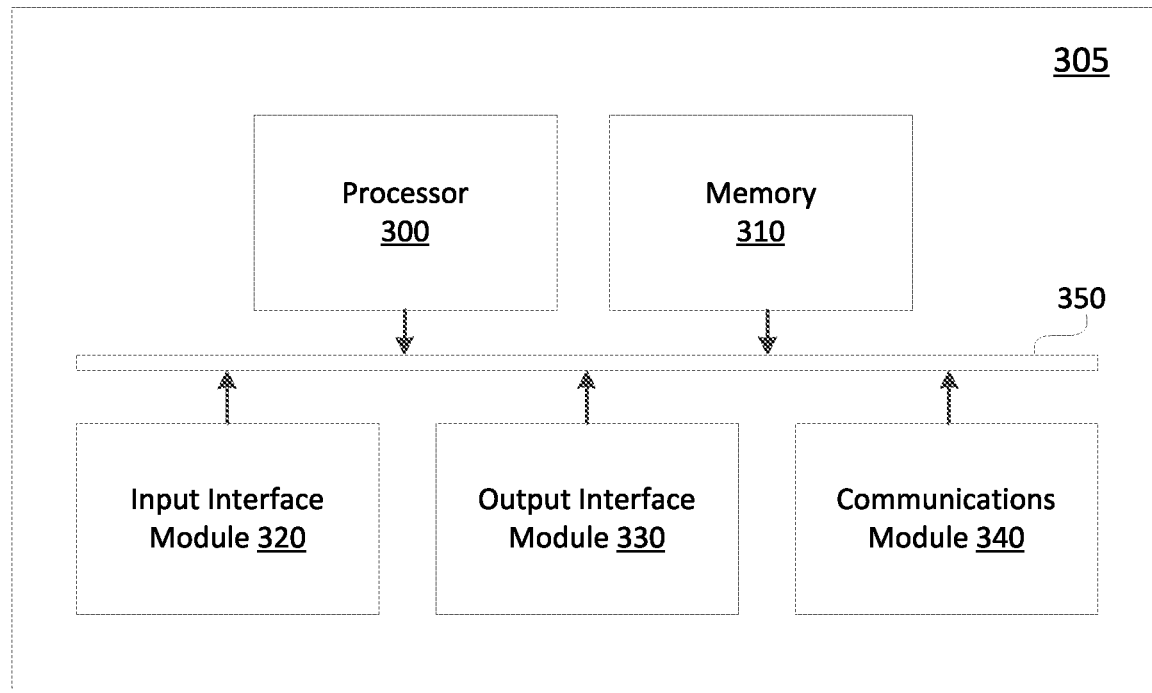
FIG. 3A is a high-level schematic diagram of an example computing device.

FIG. 3A is a high-level operation diagram of an example computing device 305. In at least some embodiments, the example computing device 305 may be exemplary of one or more of: the resource server 205, the client device 230, and the payment processing system 250. The example computing device 305 includes a variety of modules. For example, the example computing device 305, may include a processor 300, a memory 310, an input interface module 320, an output interface module 330, and a communications module 340. As illustrated, the foregoing example modules of the example computing device 305 are in communication over a bus 350.

The processor 300 is a hardware processor. The processor 300 may, for example, be one or more ARM, Intel x86, PowerPC processors or the like.

The memory 310 allows data to be stored and retrieved. The memory 310 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 305.

The input interface module 320 allows the example computing device 305 to receive input signals. Input signals may, for example, correspond to input received from a user. The input interface module 320 may serve to interconnect the example computing device 305 with one or more input devices. Input signals may be received from input devices by the input interface module 320. Input devices may, for example, include one or more of a touchscreen input, keyboard, trackball or the like. In some embodiments, all or a portion of the input interface module 320 may be integrated with an input device. For example, the input interface module 320 may be integrated with one of the aforementioned example input devices.

The output interface module 330 allows the example computing device 305 to provide output signals. Some output signals may, for example allow provision of output to a user. The output interface module 330 may serve to interconnect the example computing device 305 with one or more output devices. Output signals may be sent to output devices by output interface module 330. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 330 may be integrated with an output device. For example, the output interface module 330 may be integrated with one of the aforementioned example output devices.

The communications module 340 allows the example computing device 305 to communicate with other electronic devices and/or various communications networks. For example, the communications module 340 may allow the example computing device 305 to send or receive communications signals. Communications signals may be sent or received according to one or more protocols or according to one or more standards. For example, the communications module 340 may allow the example computing device 305 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 340 may allow the example computing device 305 to communicate using near-field communication (NFC), via Wi-Fi™, using Bluetooth™ or via some combination of one or more networks or protocols. Contactless payments may be made using NFC. In some embodiments, all or a portion of the communications module 340 may be integrated into a component of the example computing device 305. For example, the communications module may be integrated into a communications chipset.

Software comprising instructions is executed by the processor 300 from a computer-readable medium. For example, software may be loaded into random-access memory from persistent storage of memory 310. Additionally, or alternatively, instructions may be executed by the processor 300 directly from read-only memory of memory 310.

Figure 3B:
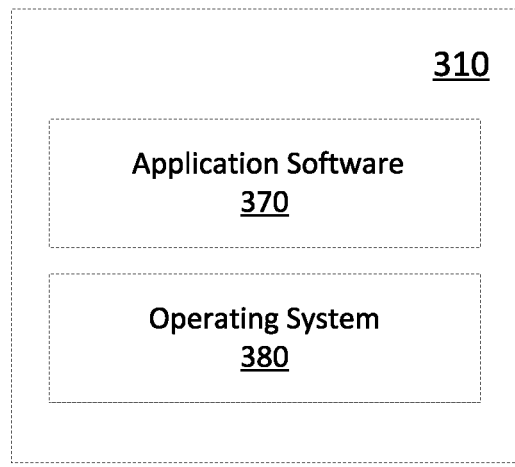
FIG. 3B shows a simplified organization of software components stored in a memory of the computing device of FIG. 3A.

FIG. 3B depicts a simplified organization of software components stored in memory 310 of the example computing device 305. As illustrated, these software components include application software 370 and an operating system 380.

The application software 370 adapts the example computing device 305, in combination with the operating system 380, to operate as a device performing a particular function. The operating system 380 is software. The operating system 380 allows the application software 370 to access the processor 300, the memory 310, the input interface module 320, the output interface module 330 and the communications module 340. The operating system 380 may be, for example, Apple iOS™, Google's Android™, Linux™, Microsoft Windows™, or the like.

Figure 4:
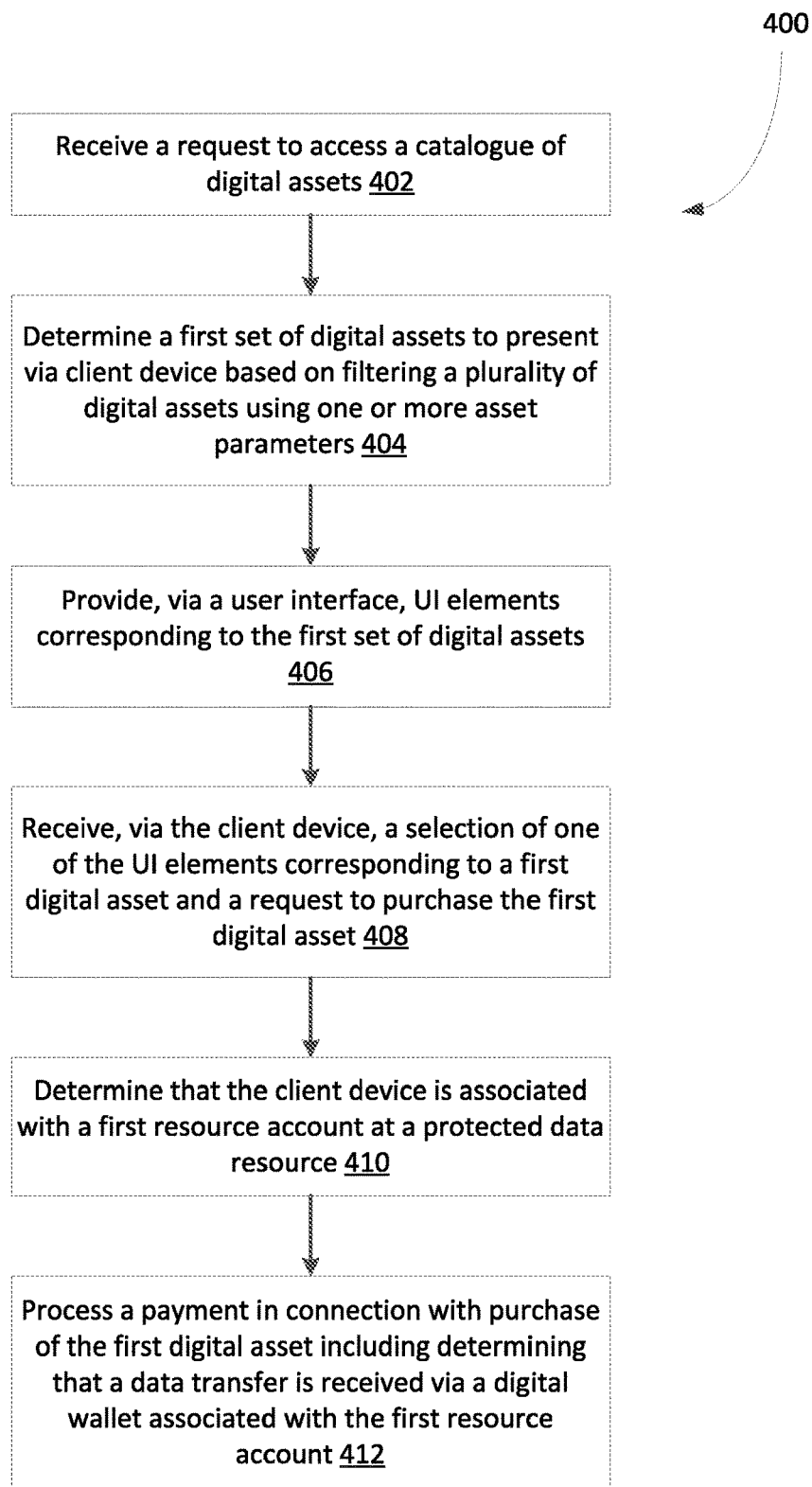
FIG. 4 shows, in flowchart form, an example method for managing transfers of digital assets.

Reference is now made to FIG. 4, which shows, in flowchart form, an example method 400 for managing transfers of digital assets. The method 400 may be performed by a computing system that implements asset transfer control, such as the digital asset transfer management engine 210 of FIG. 2. As detailed above, the digital asset transfer management engine may be a service that is provided within or external to a resource server to facilitate, among others, transfer of digital assets between merchants and customers associated with the resource server. In particular, the method 400 may be included as part of a process for transferring digital assets in real-time.

In operation 402, the digital asset transfer management engine receives a request to access a catalogue of digital assets. The digital assets may, for example, comprise cryptographic tokens, such as a non-fungible token (NFT). The request to access the catalogue is received via a client device. In at least some implementations, the client device may be associated with a particular user of a platform for exchanging digital assets. The digital asset platform may enable users to browse a catalogue of digital assets for purchase. Users can generate, via the digital asset platform, the request to access the catalogue on their client device. The request indicates one or more asset parameters. For example, the request may include a user's selection of asset parameters, such as asset type, asset size, associated object properties, etc., which may be used for specifying a description of assets of the catalogue that is desired to be accessed by the user on the digital asset platform.

In operation 404, the digital asset transfer management engine determines a first set of digital assets to present via the client device based on filtering a plurality of digital assets using the one or more asset parameters. Each of one or more of the digital assets of the first set may comprise a token associated with a defined project data object. In particular, the digital asset platform may enable filtering digital assets based on various criteria and parameters of projects that are associated with the digital assets. Each project data object may be validated by a regulator entity prior to being presented via the client device as part of the first set. In some implementations, the project data object may comprise, at least, display data associated with a validated project. The digital asset may comprise a token for accessing access-limited features associated with the project data object.

In operation 406, the digital asset transfer management engine provides, via a user interface on the client device, one or more user interface elements corresponding to the first set of digital assets. The user interface elements may be presented, for example, via a graphical user interface of an application for accessing the digital asset platform. A user may log in to the digital asset platform and browse (or search for) digital assets that are associated with various vetted projects. The subset of digital assets in which the user expresses interest may be displayed via the graphical user interface of the application in the form of selectable user interface elements. The selection of a user interface element may initiate a process for retrieving asset data for a digital asset corresponding to the selected user interface element to present to the user.

In operation 408, the digital asset transfer management engine receives, via the client device, a selection of one of the user interface elements corresponding to a first digital asset and a request to purchase the first digital asset. The first digital asset may comprise one of a limited set of tokens that are available in connection with a defined project data object. For example, the first digital asset may be an NFT associated with a vetted project. The NFT may be of limited inventory on one or more public blockchain networks and digital asset marketplaces.

In operation 410, the digital asset transfer management engine determines that the client device is associated with a first resource account at a protected data resource. In some implementations, the protected data resource may comprise a computing system associated with a bank server, and the first resource account may be a bank account of a user associated with the client device. The first resource account may, for example, be a bank account that is connected to the user's account on the digital asset platform at the time of registration or subsequently (e.g., by setting a connected account). The digital asset transfer management engine may prompt the user to input, using the client device, login credentials (or other account identifying information) for the first resource account in order to verify that the client device is associated with the first resource account. In some implementations, the digital asset transfer management engine may detect that the user is currently, or was previously, logged in to the first resource account on an application associated with the protected data resource, such as a banking app, and determine that the client device is associated with the first resource account.

In operation 412, the digital asset transfer management engine processes a payment in connection with purchase of the first digital asset. The digital asset transfer management engine determines that a data transfer is received via a digital wallet associated with the first resource account. The digital wallet may, for example, comprise a Web3 wallet that integrates with a resource account at the protected data resource, such as a bank account. The digital wallet is configured to interact with Web3 (i.e., decentralized) applications built on blockchain technology. Such wallets can be used to store and manage digital assets, such as cryptocurrencies, NFTs, and other digital tokens. A user can log in to their resource account and use one or more connected digital wallets for interacting with various blockchain networks. For example, a user may transfer or otherwise convert resources (e.g., funds) in their resource account to cryptocurrencies that are suitable for purchase activities on a blockchain network. This may allow purchase of digital assets using fiat money from existing resource accounts, simplifying the purchase experience for users of the digital asset platform.

In at least some implementations, the digital asset transfer management engine may validate a login of a user associated with the client device to the first resource account prior to processing the payment. Upon successful verification, the digital asset transfer management engine may transmit signals to a server associated with the protected data resource instructing the server to initiate transfer of data associated with the digital wallet for obtaining the selected first digital asset.

Figure 5:
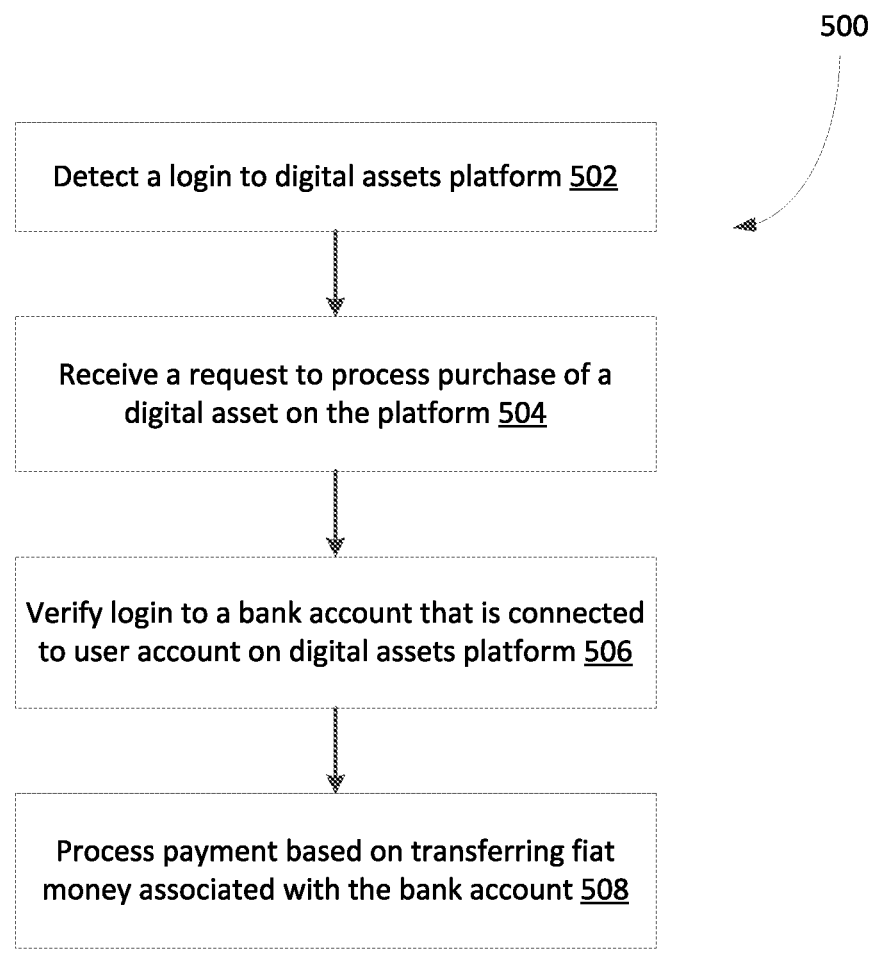
FIG. 5 shows, in flowchart form, another example method for managing transfers of digital assets.

Reference is now made to FIG. 5, which shows, in flowchart form, another example method 500 for managing transfers of digital assets. The method 500 may be performed by a computing system that implements asset transfer control, such as the digital asset transfer management engine 210 of FIG. 2. The operations of method 500 may be performed in addition to, or as alternatives of, one or more of the operations of method 400 of FIG. 4.

A digital asset platform may enable users of the platform to browse, search for, and purchase digital assets directly from the platform. By way of example, the digital asset platform may compile asset data of NFTs which represent "shares" in projects, such as a musical album, digital art, etc., that can be purchased. Each share may represent a share in royalties (or revenue) associated with the projected. A prospective investor may wish to browse such NFTs on the digital asset platform to invest in any one of the available projects associated with the NFTs.

In operation 502, the digital asset transfer management engine detects a login to the digital asset platform. The detected login may be a login to a specific user account on the digital asset platform. For example, a successful login may be detected upon determining that a correct combination of authentication credentials for a user account are inputted to a user interface of the digital asset platform.

The digital asset transfer management engine receives, via a client device, a request to process purchase of a digital asset on the platform, in operation 504. The request may be inputted via the user interface, for example, by a user's selection of a user interface element corresponding to a specific digital asset that is available for purchase on the platform. For example, a user of the platform may navigate to an asset page corresponding to a specific digital asset and select a user interface element for processing a purchase of the digital asset. The request may be processed only if it is determined that there is available inventory of the digital asset (i.e., in one or more public blockchain networks and digital asset marketplaces).

In operation 506, the digital asset transfer management engine verifies login to a bank account that is connected to the user's account on the digital asset platform. In some implementations, verifying the login to a bank account may include verifying that the requesting user is associated with a digital wallet, such as a Web3 wallet, for the bank account. A bank account may be associated with one or more digital wallets, and login to any one of the connected digital wallets may be recognized as a successful login to the bank account for purposes of making a purchase of the selected digital asset.

In operation 508, the digital asset transfer management engine processes payment in connection with the purchase request based on transferring fiat money associated with the bank account. The digital asset transfer management engine may be configured to determine a value, in fiat money, of the user-selected digital wallet, and transfer the value to a designated seller of the digital asset.

Figure 6:
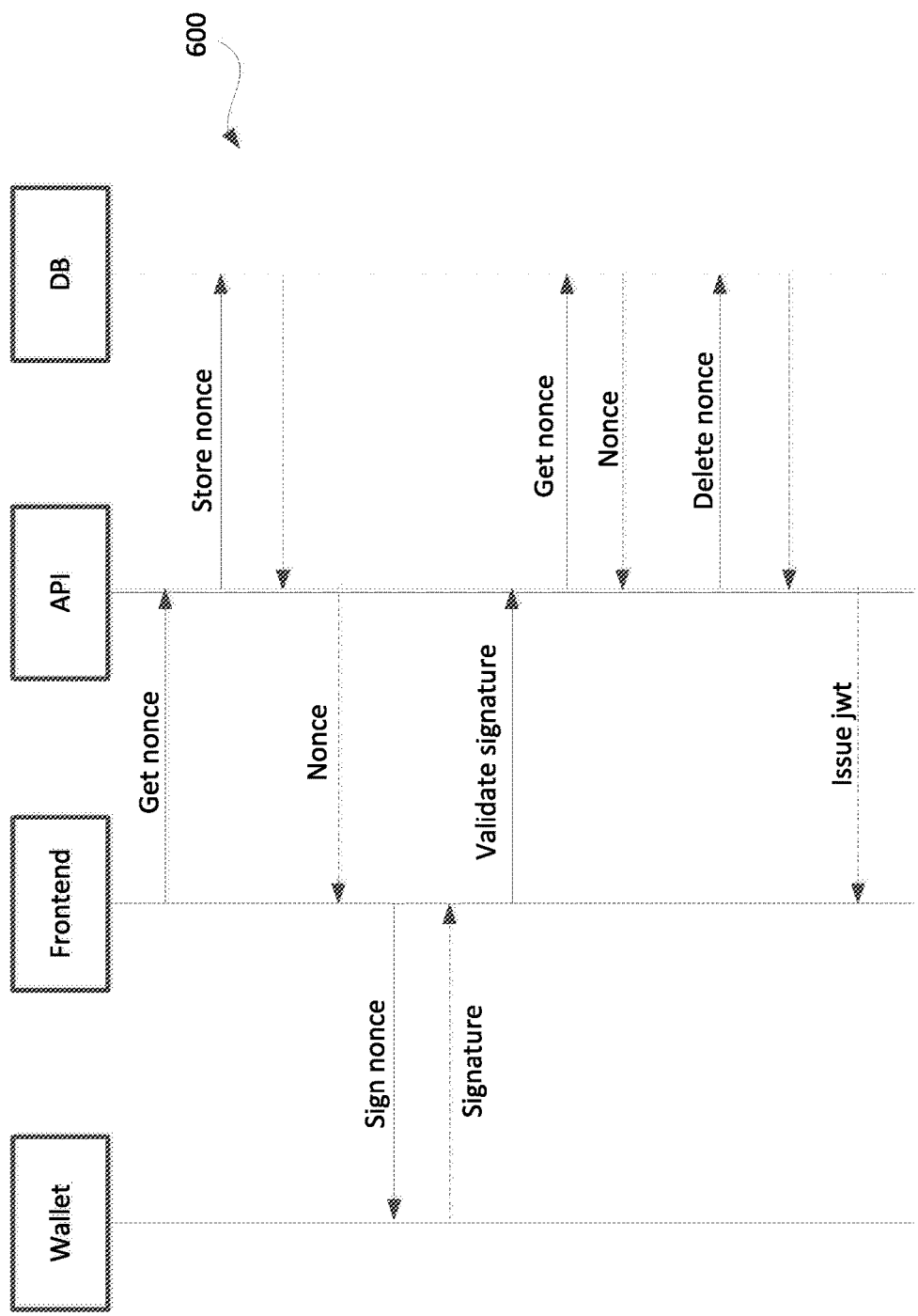
FIG. 6 shows a sequence diagram of an example method for authenticating users of a platform for exchanging digital assets.

Reference is now made to FIG. 6, which shows a sequence diagram of an example method 600 for authenticating users of a platform for exchanging digital assets. The method 600 may be performed by a computing system that implements asset transfer control, such as the digital asset transfer management engine 210 of FIG. 2. The operations of method 600 may be performed in addition to, or as alternatives of, one or more of the operations of methods 400 and 500.

A user of the digital asset platform can connect their digital wallet, such as a Web3 wallet, to their existing user account on the digital asset platform. The digital wallet may be a wallet that integrates with the user's personal bank account. If a wallet is connected, it can be used as the user's login to the platform for authentication purposes.

The frontend of the application for accessing the digital asset platform may retrieve a nonce value from a database using an API. Once the nonce is retrieved, it may be transmitted to one of the user's connected digital wallets to be signed. The user's digital signature is required in order to login and/or to create a profile. In some implementations, the nonce may be signed using a digital signature generated through the user's private key stored in the digital (e.g., Web3) wallet. In particular, the digital signature may be generated through a private key associated with the user that is stored in their digital wallet. The signature can be verified using the user's public key by the application's API, and a JWT token may be generated. The JWT token may then be issued to the frontend.

Figure 7:
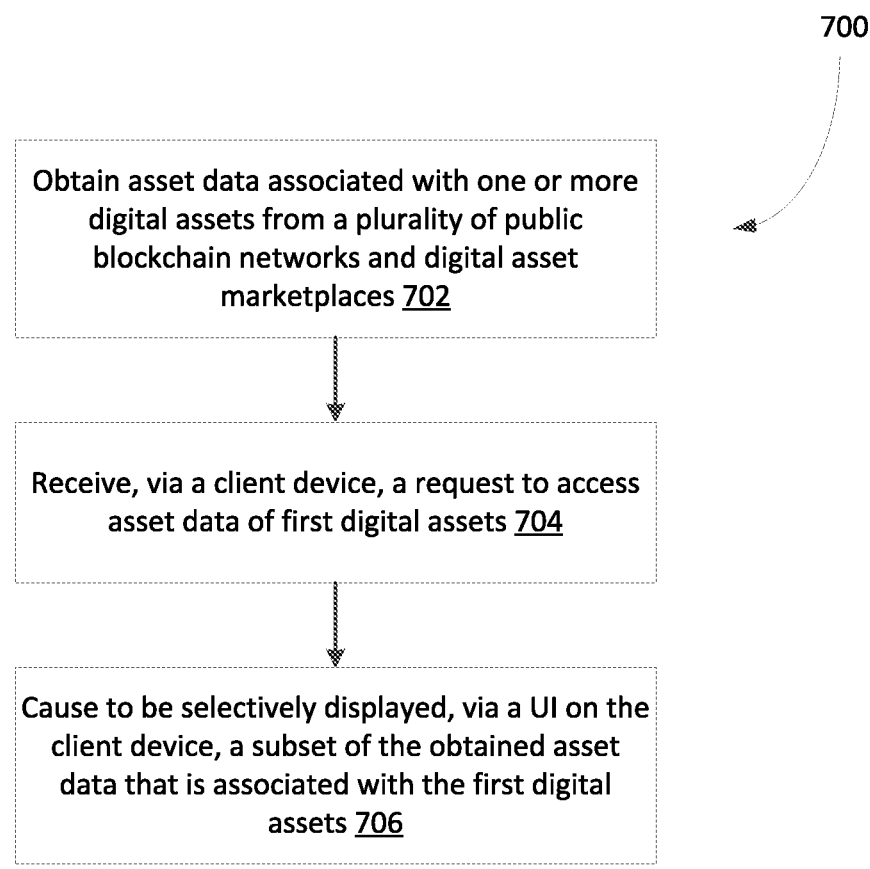
FIG. 7 shows, in flowchart form, an example method for aggregating digital assets data from a plurality of data sources.

Reference is now made to FIG. 7, which shows, in flowchart form, an example method 700 for aggregating digital assets data from a plurality of data sources. The method 700 may be performed by a computing system that implements asset transfer control, such as the digital asset transfer management engine 210 of FIG. 2. The operations of method 700 may be performed in addition to, or as alternatives of, one or more of the operations of methods 400 to 600.

In operation 702, the digital asset transfer management engine obtains asset data associated with one or more digital assets from a plurality of public blockchain networks and digital asset marketplaces. The digital assets may comprise, for example, at least one non-fungible token (NFT). The digital asset transfer management engine may transmit, to multiple public blockchain networks and digital asset marketplaces, data retrieval requests to obtain the asset data. The data retrieval requests may be transmitted, for example, via a batch process. The batch may comprise "an extract, transform, load" (ETL) pipeline for pulling data from a plurality of data sources and loading it into a designated database. The batch process may be configured to run on a schedule, or it may be flexible to run at any time (e.g., on-demand).

In at least some implementations, the data retrieval requests may be transmitted in response to receiving the request to access asset data of the first digital assets. The asset data may be obtained, for example, via WebSocket interfaces associated with one or more of the public blockchain networks or digital asset marketplaces. The data sources may provide WebSocket interfaces which may prevent the need for a scheduled batch. Instead, the data from the sources may be captured in real-time (or near real-time) as blockchain events occur.

The data sources may include, among others: services (e.g., Alchemy API) providing interfaces that expose various blockchains' data; APIs providing data related to NFT collections (e.g., Rarible API); APIs (e.g., Coinbase API) providing exchange rate information between currencies, including cryptocurrencies; and source location for media content displayed via user interface of the application.

The digital asset transfer management engine may implement an application programming interface (API) for exposing digital asset data to the frontend of the application. For example, the digital asset transfer management engine may use the API in providing a graphical user interface for the application that displays relevant asset data of digital assets on the platform. By way of example, transaction history data may be loaded as requested or on-demand when a user navigates to a particular NFT history page for a particular NFT using the application's frontend (i.e., application GUI). The data may then be cached and stored for future use.

In operation 704, the digital asset transfer management engine receives, via a client device, a request to access asset data of first digital assets. The request to access asset data may comprise input of a search query to initiate search of digital assets associated with the public blockchain networks and/or digital asset marketplaces. The request may be generated via a digital asset platform for exchanging digital assets. In particular, a user of the digital asset platform may request to access the asset data.

In some implementations, the digital asset transfer management engine may receive, via a client device associated with a user of the digital asset platform, a request to connect a digital wallet to the digital asset platform. The digital wallet may, for example, be a Web3 wallet. The digital asset transfer management engine may be configured to store, in a memory, authentication credentials associated with the digital wallet. The digital asset transfer management engine may receive a login request for logging in to a user account on the digital asset platform. The login request may include, at least, a digital signature that is generated using a private key associated with a user's digital wallet. The digital asset transfer management engine may validate a login based on verifying the digital signature using a public key associated with the user.

In operation 706, the digital asset transfer management engine causes to be selectively displayed, via a user interface on the client device, a subset of the obtained asset data that is associated with the first digital assets. In at least some implementations, the user interface may provide access to user account information, such as favorited digital assets, created and/or collected digital assets, and the like. A digital asset page, such as an NFT details page, may include detailed information about a selected digital asset, such as description, network identity, address of smart contract, unique token ID, digital asset name, price, and transaction or minting history.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:
1. A computing system, comprising:
a processor; and
a memory coupled to the processor, the memory storing processor-executable instructions that, when executed by the processor, cause the processor to:
detect login to a first user account of a digital asset platform;

receive, via a client device, input of a search query to initiate a search of a catalogue of digital assets on a digital asset platform, the search query indicating one or more search parameters;

provide, via a user interface on the client device, one or more user interface elements corresponding to a first set of digital assets that are identified using the one or more search parameters;

receive, via the client device, a selection of one of the user interface elements corresponding to a first digital asset and a request to acquire the first digital asset;

verify login to a first resource account at a protected data resource that is connected to the first user account of the digital asset platform, wherein verifying the login to the first resource account includes detecting login to a digital wallet that is associated with the first resource account; and in response to verifying the login to the first resource account, process a resource transfer from the first resource account in connection with acquiring the first digital asset, wherein the processing includes determining that a resource transfer is received via the digital wallet associated with the first resource account.

2. The computing system of claim 1, wherein the digital assets comprise at least one non-fungible token (NFT).

3. The computing system of claim 1, wherein each of the digital assets of the first comprises a token associated with a defined project data object and wherein the project data object is validated by a regulator entity prior to being presented via the client device as part of the first set.

4. The computing system of claim 1, wherein the protected data resource comprises a computing system associated with a bank server and wherein the first resource account comprises a bank account of a user of the client device.

5. The computing system of claim 1, wherein the digital wallet comprises a Web3 wallet.

6. The computing system of claim 1, wherein the instructions, when executed, are to further cause the processor to transfer the first digital asset to the digital wallet associated with the first resource account.

7. The computing system of claim 3, wherein the project data object comprises display data associated with a validated project for presenting via the client device.

8. The computing system of claim 3, wherein the digital asset comprises a token for accessing access-limited features associated with the project data object.

9. The computing system of claim 1, wherein the first digital asset comprises one of a limited set of tokens that are available in connection with a defined project data object.

10. A computer-implemented method, comprising:

detecting login to a first user account of a digital asset platform;

receiving, via a client device, input of a search query to initiate a search of a catalogue of digital assets on a digital asset platform, the search query indicating one or more search parameters;

providing, via a user interface on the client device, one or more user interface elements corresponding to a first set of digital assets that are identified using the one or more search parameters;

receiving, via the client device, a selection of one of the user interface elements corresponding to a first digital asset and a request to acquire the first digital asset;

verifying login to a first resource account at a protected data resource that is connected to the first user account of the digital asset platform, wherein verifying the login to the first resource account includes detecting login to a digital wallet that is associated with the first resource account; and in response to verifying the login to the first resource account, processing a resource transfer from the first resource account in connection with acquiring the first digital asset, wherein the processing includes determining that a resource transfer is received via the digital wallet associated with the first resource account.

11. The method of claim 10, wherein the digital assets comprise at least one non-fungible token (NFT).

12. The method of claim 10, wherein each of the digital assets of the first comprises a token associated with a defined project data object and wherein the project data object is validated by a regulator entity prior to being presented via the client device as part of the first set.

13. The method of claim 10, wherein the protected data resource comprises a computing system associated with a bank server and wherein the first resource account comprises a bank account of a user of the client device.

14. The method of claim 10, wherein the digital wallet comprises a Web3 wallet.

15. The method of claim 10, further comprising transferring the first digital asset to the digital wallet associated with the first resource account.

16. The method of claim 12, wherein the project data object comprises display data associated with a validated project for presenting via the client device.

17. The method of claim 12, wherein the digital asset comprises a token for accessing access-limited features associated with the project data object.

18. The method of claim 10, wherein the first digital asset comprises one of a limited set of tokens that are available in connection with a defined project data object.

* * * * *